(12) United States Patent
Chen et al.

(10) Patent No.: US 8,734,950 B2
(45) Date of Patent: May 27, 2014

(54) RESIN COMPOSITION AND USES OF THE SAME

(75) Inventors: Hsien-Te Chen, Chupei (TW);
Mei-Ling Chu, Chupei (TW);
Tsung-Hsien Lin, Chupei (TW);
Chih-Wei Liao, Chupei (TW)

(73) Assignee: Taiwan Union Technology Corporation, Chupei, Hsinchu County (TW)

( * ) Notice: Subject to any disclaimer, the term of this patent is extended or adjusted under 35 U.S.C. 154(b) by 0 days.

(21) Appl. No.: 13/161,311

(22) Filed: Jun. 15, 2011

(65) Prior Publication Data

US 2012/0263955 A1 Oct. 18, 2012

(30) Foreign Application Priority Data

Apr. 12, 2011 (TW) .................................. 100112628

(51) Int. Cl.
*B32B 15/092* (2006.01)
*B32B 17/06* (2006.01)
*C08G 59/18* (2006.01)

(52) U.S. Cl.
USPC .......................................... 428/413; 523/437

(58) Field of Classification Search
None
See application file for complete search history.

(56) References Cited

U.S. PATENT DOCUMENTS

| 4,167,539 | A | * | 9/1979 | Heilman et al. | ............... 525/117 |
| 5,821,305 | A | * | 10/1998 | Schutyser et al. | ............ 525/112 |
| 8,022,140 | B2 | | 9/2011 | Tikart et al. | |
| 2002/0082350 | A1 | | 6/2002 | Tikart | |
| 2002/0137818 | A1 | * | 9/2002 | Yu et al. | .......................... 523/161 |
| 2007/0178300 | A1 | * | 8/2007 | Amla et al. | .................... 428/332 |
| 2011/0048776 | A1 | | 3/2011 | Qiang | |
| 2012/0083564 | A1 | | 4/2012 | Storer et al. | |

FOREIGN PATENT DOCUMENTS

| CN | 101602881 | 5/2009 |
| EP | 417837 | 9/1990 |
| WO | WO 96/07683 | 3/1996 |
| WO | WO 98/18845 | 5/1998 |
| WO | 2011005420 A1 | 1/2011 |

* cited by examiner

*Primary Examiner* — Callie Shosho
*Assistant Examiner* — Coris Fung
(74) *Attorney, Agent, or Firm* — Greer, Burns & Crain, Ltd.

(57) ABSTRACT

A resin composition is provided. The resin composition comprises an epoxy resin and a hardener, wherein the amount of the hardener is about 10 parts by weight to about 200 parts by weight per 100 parts by weight of the epoxy resin and the hardener comprises a first styrene-maleic anhydride copolymer (SMA) copolymer and a second SMA copolymer, the first SMA copolymer has a molar ratio of styrene to maleic anhydride m1, the second SMA copolymer has a molar ratio of styrene to maleic anhydride m2, and m1−m2≥3.

12 Claims, 3 Drawing Sheets

RESIN COMPOSITION AND USES OF THE SAME

CROSS-REFERENCES TO RELATED APPLICATIONS

This application claims priority to Taiwan Patent Application No. 10012628 filed on Apr. 12, 2011.

CROSS-REFERENCES TO RELATED APPLICATIONS

Not applicable.

BACKGROUND OF THE INVENTION

1. Field of the Invention

The present invention relates to a resin composition and its application. Specifically, the present invention relates to an epoxy resin composition having at least two different styrene-maleic anhydride (SMA) copolymers with different molar ratios of styrene to maleic anhydride as a hardener, and a prepreg and a laminate prepared by using the epoxy resin composition.

2. Descriptions of the Related Art

Printed circuit boards are circuit substrates that are used for electronic devices to load other electronic components and to electrically connect the components so as to provide a stable circuit working environment. One kind of conventional printed circuit boards is a copper clad laminate (CCL), which is primarily composed of resin, reinforcing material and copper foil. The resin may be, for example, epoxy resin, novolac resin, polyamine formaldehyde resin, silicone resin or polytetrafluoroethylene resin; and the reinforcing material may be, for example, glass fiber cloth, glass fiber mat, insulating paper or linen cloth.

Considering the subsequent electronic processes, the properties such as heat resistance, size stability, chemical stability, workability, toughness, and mechanical strength etc. should be taken into consideration during the preparation of the printed circuit board. Generally, epoxy resin is the most popular resin in the printed circuit board industry since a printed circuit broad prepared by using epoxy resin can properly meet the above requirements. Epoxy resin is generally considered as an organic, high molecular compound comprising two or more epoxy groups and is a reactive monomer. A highly cross-linked structure can be obtained by polymerizing molecules with a high epoxy group content. Although a highly cross-linked structure possesses a relatively high hardness and glass transition temperature (Tg) as well as a good chemical resistance, it also possesses poor impact resistance which is disadvantageous to the subsequent processes.

FR-4 laminate prepared by using epoxy resin, for example, has a relatively high dielectric constant (Dk) and dissipation factor (Df). A high Dk will slow down the signal transmission rate of the laminate and a high Df will make part of the signals produce energy transformation and then be lost within the laminate due to material resistance. Therefore, the industry is committed to improve and provide a lower Dk and Df.

Because styrene-maleic anhydride copolymer (hereinafter abbreviated as SMA copolymer; see formula (I) as below) has a capability of lowering Dk and Df, it is commonly used as an epoxy resin hardener. For each SMA copolymer unit, the higher the molar ratio of styrene to maleic anhydride (i.e. greater m value) the lower the Df value of the prepared laminate and the better the electrical properties of the prepared laminate, while the Tg value of the laminate is relatively low (e.g., m=1, Tg is about 155° C.; m=8, Tg is usually about 104° C.). In addition, if m is too high (e.g. ≥8), the surface stickiness of the prepregs for preparing laminates will be higher and the prepregs will tend to stick with each other, which is unfavorable to the operation. On the contrary, the lower the molar ratio of styrene to maleic anhydride in each SMA copolymer unit (eg. m≤3) the higher the Tg of the prepared laminate and the better the heat resistance of the prepared laminate, but the laminate will become brittle, which will result in powder pollution during the processing.

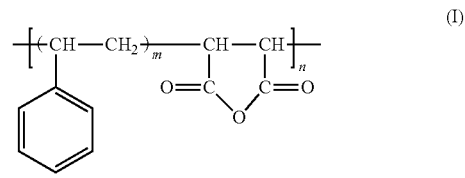

(I)

WO9818845 disclosed a method to improve the brittleness, which uses tetrabromobisphenol A (TBBPA or TBBA), tetrabromobisphenol A diglycidyl ether (TBBAPDGE), or a mixture thereof as a co-hardener and uses SMA copolymer as a hardener to cure the FR-4 epoxy resin so as to increase the toughness, Tg, and stability of the laminate. Furthermore, EP417837 and WO9607683 respectively described an allyl-containing (for example, triallyl isocyanurate (TAIC)) IPN polymer resin composition for printed circuit boards. Although the addition of TAIC can improve the toughness of the prepared laminate, it is unfavorable to the electrical property (high Df) and the promotion of Tg achieved thereby is not significant.

In view of the above, the present invention provides a novel epoxy resin composition. The surface of the prepregs prepared by using the epoxy resin composition will not stick to each other and the laminate prepared by these prepregs is provided with good wet fastness and solder floating resistance as well as good electrical properties (low Dk/Df) and toughness.

SUMMARY OF THE INVENTION

An objective of the present invention is to provide a resin composition comprising an epoxy resin and a hardener, wherein the amount of the hardener is about 10 parts by weight to about 200 parts by weight per 100 parts by weight of the epoxy resin and the hardener comprises a first styrene-maleic anhydride (SMA) copolymer and a second SMA copolymer, the first SMA copolymer has a molar ratio of styrene to maleic anhydride, m1, the second SMA copolymer has a molar ratio of styrene to maleic anhydride, m2, and m1−m2≥3.

Another objective of this invention is to provide a prepreg prepared by immersing a substrate into the above resin composition and drying the immersed substrate.

Yet a further objective of this invention is to provide a laminate which is prepared by superimposing a plurality of the aforesaid prepreg and superimposing a metal foil on at least one external surface of the superimposed prepregs to provide a superimposed object, and performing a hot-pressing operation to the superimposed object.

To render the above objects, technical features and advantages of the present invention more apparent, the present invention will be described in detail with reference to some embodiments hereinafter.

DESCRIPTION OF THE PREFERRED EMBODIMENT

Figure 1:
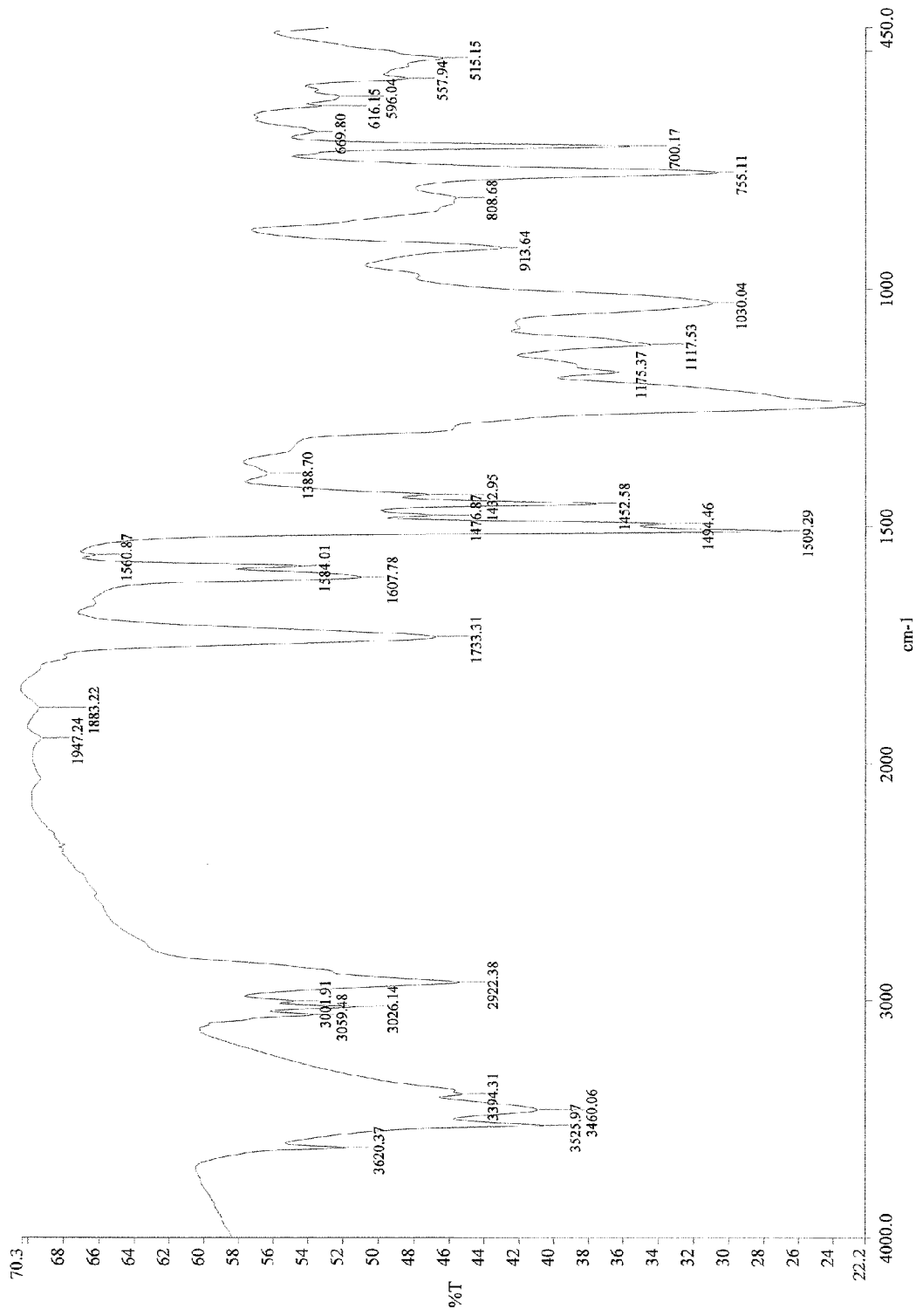
FIG. 1 is the IR (infrared) spectrum of the laminate prepared by the resin composition of example 3.

The following will describe some embodiments of the present invention in detail. However, without departing from the spirit of the present invention, the present invention may be embodied in various embodiments and should not be limited to the embodiments described in the specification. In addition, unless it is specifically indicated, the expressions "a," "the," or the like recited in the specification (especially in the attached claims) should include the singular and the plural forms. Furthermore, unless it is specifically indicated, while describing the constituents in the solution, mixture and composition in the specification, the amount of each constituent is counted based on the solids (i.e., the weight of solvent is excluded).

The resin composition of the present invention comprises a hardener provided by blending at least two different SMA copolymers with different molar ratios of styrene to maleic anhydride. The laminate prepared by using the resin composition is provided with improved properties (such as a higher solder floating resistance, a lower hygroscopicity, a better electrical property and/or toughness). Furthermore, no powder agglomerate occurs when other powders are added into the epoxy resin composition of the present invention.

Specifically, the resin composition of the present invention comprises an epoxy resin and a hardener. One of the features of the resin composition is that the hardener comprises a first styrene-maleic anhydride copolymer (hereinafter referred to as "first SMA copolymer") and a second styrene-maleic anhydride copolymer (hereinafter referred to as "second SMA copolymer"). The first SMA copolymer has a molar ratio of styrene to maleic anhydride, m1, the second SMA copolymer has a molar ratio of styrene to maleic anhydride, m2, and m1−m2≥3, preferably m1−m2≥5. It is found that under the above conditions, the disadvantage of using single SMA copolymer with high molar ratio of styrene to maleic anhydride or with low molar ratio of styrene to maleic anhydride can be eliminated and the advantages of the SMA copolymers can be combined, when using both a SMA copolymer with a high molar ratio of styrene to maleic anhydride and one with a low molar ratio of styrene to maleic anhydride as the hardener.

In the resin composition of the present invention, there is no particular limitation on the values of m1 and m2. In respect to commercially available SMA copolymers, m1 is preferably ≥8 and m2 is preferably <8, e.g., the molar ratio of styrene to maleic anhydride of the second SMA copolymer is preferably less than 4 (i.e. m2 is <4) when the molar ratio of styrene to maleic anhydride of the first SMA copolymer is greater than 8. In an embodiment of the present invention, EF-80 (Satoma company), with a molar ratio of styrene to maleic anhydride of 8 (i.e. m1=8), is used as the first SMA copolymer and SMA-3000 (Satoma company), with a molar ratio of styrene to maleic anhydride of 3 (i.e. m2=3) is used as the second SMA copolymer. In view of the disclosure of the specification, persons with ordinary skills in the art can use other known SMA copolymers that conform to the required molar ratio of styrene to maleic anhydride to provide the resin composition of the present invention.

In the resin composition of the present invention, the amount of hardener can be adjusted by the user depending on the needs. Generally, the amount of the hardener is preferably, but not limited to, about 10 parts by weight to about 200 parts by weight per 100 parts by weight of the epoxy resin, and more preferably about 25 parts by weight to about 100 parts by weight per 100 parts by weight of the epoxy resin. Furthermore, to effectively obtain the advantages of the first and second SMA copolymers when being used as the hardener individually, the amounts of the first SMA copolymer and the second SMA copolymer should not excessively differ from each other. Under normal circumstances, the weight ratio between the first SMA copolymer and the second SMA copolymer is preferably, but not limited to, from about 1:10 to about 10:1. In an embodiment of the resin composition of the present invention, the weight ratio between the first SMA copolymer and the second SMA copolymer is about 1:5 to about 5:1.

The epoxy resin suitable for the resin composition of the present invention is a resin with at least two epoxy groups in the molecular structure, such as a novolac epoxy resin and phosphorus-containing epoxy resin etc. As illustrated in the following examples, 9,10-dihydro-9-oxa-10-phosphaphenanthrene-10-oxide (DOPO, such as commercially available Kolon 5138) or bisphenol A epoxy aldehyde (such as commercially available Kolon 3165) was illustrated as the epoxy resin component of the resin composition of the present invention.

The resin composition of the present invention can further comprise other additives. For example, a hardening promoter may be added to provide an improved hardening effect and could be selected from, but not limited to, the following group: 2-methyl-imidazole (2MI), 2-ethyl-4-methyl-imidazole (2E4MI), 2-phenyl-imidazole (2PI) and combinations thereof. In addition, a filler may be added to improve the properties of the epoxy resin such as the processability, flammability, thermal resistance, and water fastness, and could be selected from, but not limited to, the following group: silicon dioxide, glass powder, aluminum hydroxide, Talcum, Kaolin, pryan, mica, and combinations thereof. The amounts of the hardening promoter and filler are not particularly limited and can be adjusted by persons with ordinary skill in the art depending on the needs and on the basis of the disclosure of the present invention.

In addition to the hardening promoter and filler, other conventional additives may be added to the resin composition of the present invention depending on the needs, such as a dispersing agent (i.e. a silane coupling agent), a mold-release agent, a flame retardant, a toughening agent etc., and these additives can be used alone or in combination. For example, an allyl-containing compound such as triallyl isocyanurate (TAIC) may be added to improve the toughness of the prepared laminate in an amount of about 0.01 parts by weight to about 20 parts by weight per 100 parts by weight of the epoxy resin.

The resin composition of the present invention may be prepared into varnish form by uniformly mixing the epoxy resin, the first SMA copolymer and the second SMA copolymer both as a hardener, and an optionally added filler through a stirrer, and dissolving or dispersing the mixture into a solvent for subsequent applications. The solvents capable of dissolving or dispersing the resin composition of the present invention include, but are not limited to, cyclohexanone, toluene, xylene, acetone, butanone, methyl isobutyl ketone, N,N-dimethyl formamide (DMF), N,N-dimethyl acetamide (DMAc), N-methyl-pyrolidone (NMP) and combinations thereof. The solvent can be used in any amount as long as it is sufficient for uniformly mixing each component of the resin composition. As shown in the following examples, in an embodiment of the present invention, the solvent is DMF and is in an amount of about 80 parts by weight per 100 parts by weight of the epoxy resin.

The present invention further provides a prepreg which is prepared by immersing a substrate (i.e., a reinforcement material) into a varnish of the above described resin composition and drying under appropriate drying conditions. A conventional reinforcement material includes a glass fiber cloth (such as glass fabric, glass paper, glass mat and the like), a kraft paper, a short fiber cotton paper, a natural fiber cloth, an organic fiber cloth etc. As illustrated in the following examples, in one embodiment of the present invention, 7628 glass fiber cloths was used as the reinforcement material and was heated and dried at 160° C. for 2 to 10 minutes (B-stage) to provide a prepreg in a semi-hardened state.

Furthermore, the present invention also provides a laminate which is prepared by superimposing a plurality of the prepregs and superimposing a metal foil on at least one external surface of the superimposed prepregs to provide a superimposed object, and performing a hot-pressing operation onto the superimposed object to obtain a metal clad laminate.

The present invention will be further illustrated by the embodiments hereinafter, wherein the measurement instruments and methods are respectively as follows:

[Prepreg Stickiness Test]

The stickiness is tested by visual observation if the prepared prepregs tend to stick with each other.

[Powder Dispersion Test]

The powder dispersion is tested by using an Electron microscopy to observe the prepared powder agglomerations and calculating the number of agglomerates with a size greater than 50 μm per square centimeter.

[Hygroscopicity Test]

The hygroscopicity of the laminate is tested by a pressure cooker test (PCT), i.e., subjecting the laminate into a pressure container (121° C., 100% R.H. and 2 atm) for 1 hour.

[Soldering Resistance Test]

The method for testing the solder floating endurance comprises of immersing a dried laminate in a solder bath at 288° C. for a while and then observing whether there is any defect such as delamination and expansion.

[Peeling Strength Test]

The peeling strength refers to the adhesive force of the clad metal foil to the substrate. The adhesive force is generally expressed by the force required for vertically peeling the clad copper foil with a width of one inch (25.4 mm) from the surface of the substrate. The passing standard of a substrate with 1 oz copper foil is 4 lb/in according to MIL-P-55110E.

[Glass Transition Temperature Test]

The glass transition temperature is measured by a dynamic mechanical analyzer (DMA), wherein the measuring regulations are IPC-TM-650.2.4.25C and 24 C testing method of Institute for Interconnecting and Packaging Electronic Circuits (IPC).

[Thermal Decomposition Temperature Test]

The thermal decomposition temperature test is carried out by measuring the mass loss of the sample with a thermogravimetric analyzer (TGA). The temperature where the mass loss is up to 5% is regarded as the thermal decomposition temperature.

[Flammability Test]

The flammability test is carried out according to UL94V (Vertical Burn), which comprises burning a laminate, which is held vertically, using a Bunsen burner to obtain its self-ignition and combustion-supporting properties. The result is classified from UL94V-0 (the best) to UL94V-2.

[Toughness Test]

The method for testing the toughness comprises the following steps: laying the laminate on a plane fixture, vertically placing a cross metal jig to come into contact with the surface of the laminate while applying a vertically-applied pressure to the cross metal jig, removing the cross metal jig, and observing the cross trace on the substrate. The laminate without any white embossing lines is regarded as having good toughness, the one with slight white embossing lines is regarded as having normal toughness, and the one with cracks or rupturing one is regarded as having poor toughness.

[Dielectric Constant (Dk) and Dissipation Factor (Df) Measurement]

Dk and Df are measured according to ASTM D150 under an operating frequency of 1 GHz.

EXAMPLE

[The Preparation of Resin Composition]

Example 1

According to the preparations shown in Table 1, resin composition 1 was obtained by mixing DOPO epoxy resin (Kolon 5138), the first SMA copolymer (EF-80), the second SMA copolymer (SMA-3000), 2-methylimidazole, filler (Talcum and aluminum hydroxide with a weight ratio of 1:1) and DMF in room temperature with a stirrer.

Example 2

The preparation procedures and materials of Example 1 were repeated to prepare resin composition 2 except for adjusting the ratio of the first SMA copolymer (EF-80) and the second SMA copolymer (SMA-3000) and the amount of 2-methylimidazole as shown in Table 1.

Example 3

The preparation procedures and materials of Example 1 were repeated to prepare resin composition 3 except for adjusting the ratio of the first SMA copolymer (EF-80) and the second SMA copolymer (SMA-3000) and the amount of 2-methylimidazole as shown in Table 1.

Example 4

The preparation procedures and materials of Example 1 were repeated to prepare resin composition 4 except for adjusting the ratio of the first SMA copolymer (EF-80) and the second SMA copolymer (SMA-3000) and the amount of 2-methylimidazole as shown in Table 1.

Example 5

The preparation procedures of Example 1 were repeated to prepare resin composition 5 except for adjusting the composition of the epoxy resin (Kolon 3165 and Kolon 5138 in an amount of 50 parts by weight respectively) and the amount of 2-methylimidazole as shown in Table 1.

Example 6

The preparation procedures of Example 1 were repeated to prepare resin composition 6 except for changing the species of epoxy resin (100 parts by weight of Kolon 3165) as shown in Table 1.

Example 7

The preparation procedures of Example 3 were repeated to prepare resin composition 7 except for adding 5 parts by weight of TAIC additionally as shown in Table 1.

Comparative Example 1

According to the preparations shown in Table 1, DOPO epoxy resin (Kolon 5138), the first SMA copolymer (EF-80), 2-methylimidazole, filler (Talcum and aluminum hydroxide with a weight ratio of 1:1) and DMF were mixed in room temperature with a stirrer. Comparative resin composition 1 was obtained.

Comparative Example 2

The preparation procedures of Comparative Example 1 were repeated to prepare comparative resin composition 2 except for replacing the first SMA copolymer (EF-80) with the second SMA copolymer (SMA-3000) as the hardener as shown in Table 1.

Comparative Example 3

The preparation procedures of Comparative Example 2 were repeated to prepare comparative resin composition 3 except for adding 5 parts by weight of TRIC additionally as shown in Table 1.

TABLE 1

| | Component (parts by weight) | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|---|
| Epoxy resin | Bisphenol A phenolic epoxy resin | — | — | — | — | 50 | 100 | — | — | — | — |
| | DOPO epoxy resin | 100 | 100 | 100 | 100 | 50 | — | 100 | 100 | 100 | 100 |
| Hardener | The first SMA copolymer EF-80 (m = 8) | 5 | 10 | 15 | 25 | 5 | 5 | 15 | 30 | 0 | 0 |
| | The second SMA copolymer SMA-3000 (m = 3) | 25 | 20 | 15 | 5 | 25 | 25 | 15 | 0 | 30 | 30 |
| Additive | TAIC | 0 | 0 | 0 | 0 | 0 | 0 | 5 | 0 | 0 | 5 |
| Promotor | 2-methylimidazole | 0.15 | 0.25 | 0.33 | 0.43 | 0.18 | 0.15 | 0.33 | 0.5 | 0.1 | 0.1 |
| Filler | Talcum and aluminum hydroxide (1:1) | 80 | 80 | 80 | 80 | 80 | 80 | 80 | 80 | 80 | 80 |
| Solvent | DMF | 80 | 80 | 80 | 80 | 80 | 80 | 80 | 80 | 80 | 80 |

[The Preparation of the Laminate]

Figure 2:
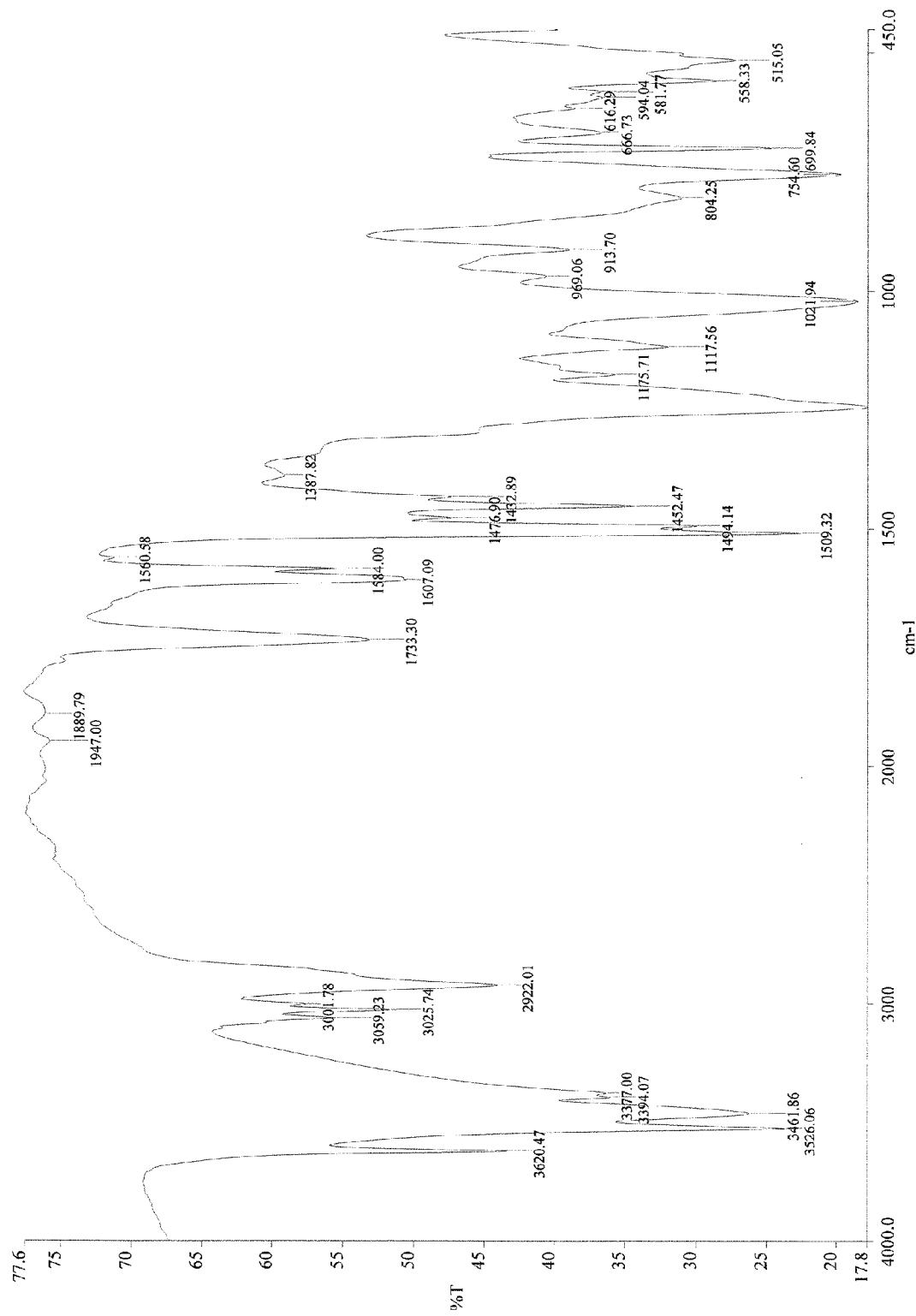
FIG. 2 is the IR spectrum of the laminate prepared by the comparative resin composition of comparative example 1.
Figure 3:
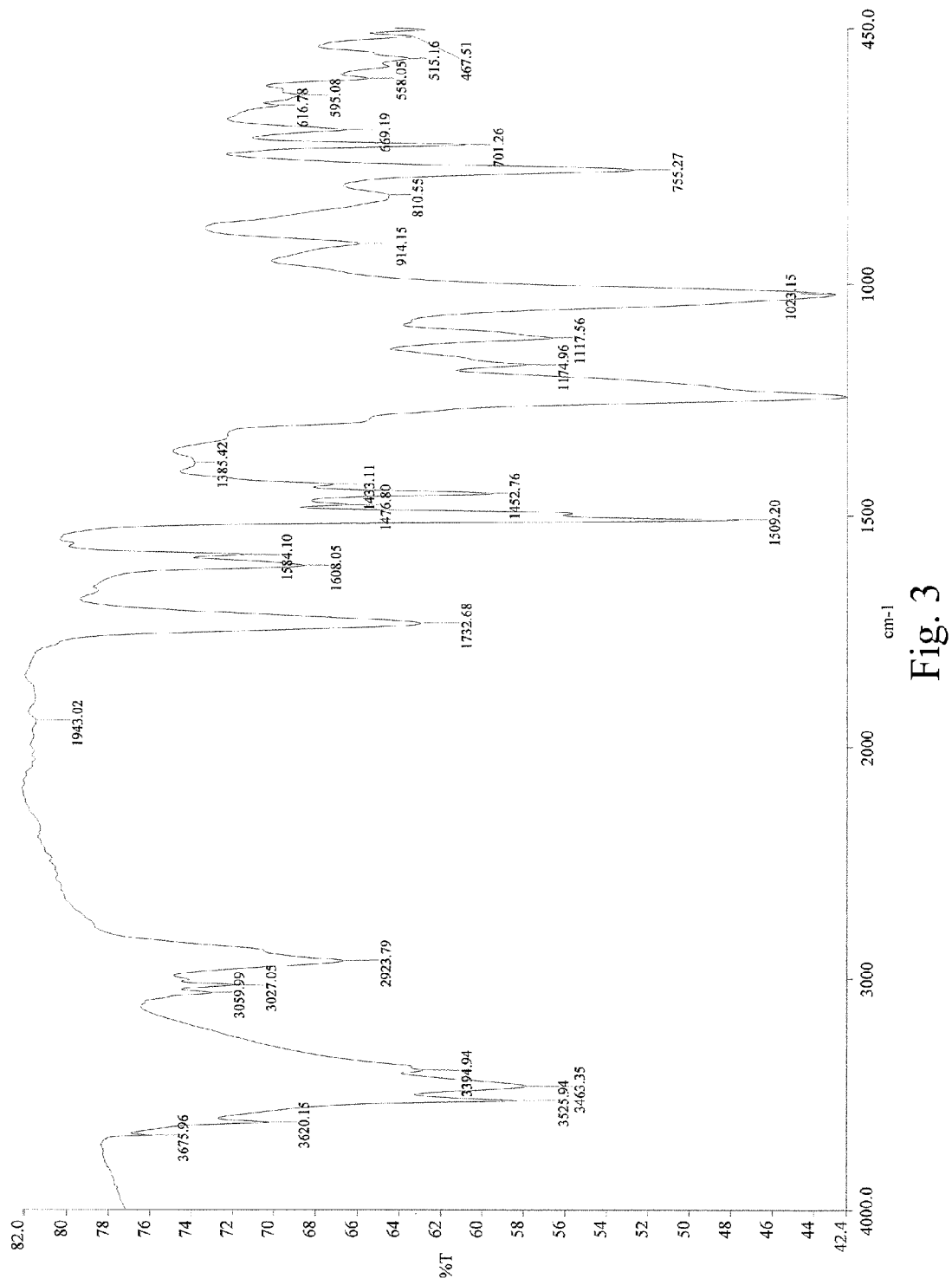
FIG. 3 is the IR spectrum of the laminate prepared by the comparative resin composition of comparative example 2.

The laminates were prepared by using the resin compositions of Examples 1 to 7 and Comparative Examples 1 to 3 respectively. In detail, the preparation of the printed circuit boards is as follows. One of the resin compositions of Examples 1 to 7 and Comparative Examples 1 to 3 was coated on the 7628 (resin/glass fiber cloth: 43%) glass fiber cloths through a roller coating machine. The coated 7628 glass fiber cloths were then placed in a dryer and dried at 160° C. for 2 to 10 minutes to prepare prepregs in a semi-hardened state. The laminate is observed to see if they tend to stick with each other and the result is shown in Table 2. Eight pieces of prepregs were superimposed. Two copper foils were respectively superimposed on the two external surfaces of the superimposed prepregs to provide a superimposed object. A hot-pressing operation was performed onto the superimposed object to obtain a copper clad laminate, wherein the hot-pressing conditions are as follows: raising the temperature to 180° C. with a raising rate of 2.0° C./min, and hot-pressing for 70 minutes under the full pressure of 15 kg/cm² (the initial pressure is 8 kg/cm² at 180° C. FIG. 1 shows the result of the IR spectrum of the laminate prepared by the resin composition 3 of Example 3. FIG. 2 shows the result of the IR spectrum of the laminate prepared by the comparative resin composition 1 of Comparative Example 1. FIG. 3 shows the result of the IR spectrum of the laminate prepared by the comparative resin composition 2 of Comparative Example 2.

The test results of the powder dispersion (powder agglomerations) of the resin composition of Examples 1 to 7 and Comparative Examples 1 to 3, and the hygroscopicity, soldering floating endurance, peeling strength, glass transition temperature (Tg), thermal decomposition temperature, flammability, toughness, dielectric constant, and dissipation factor of the laminate are shown in Table 2.

TABLE 2

| Test | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|
| >50 μm/cm² of powder agglomerations (number) | 0 | 1 | 2 | 2 | 1 | 0 | 1 | 23 | 2 | 0 |
| Hygroscopicity (%) | 0.151 | 0.149 | 0.147 | 0.152 | 0.151 | 0.153 | 0.153 | 0.165 | 0.161 | 0.162 |
| Soldering floating endurance (minute) | >10 | >10 | >10 | 9.1 | >10 | 9.5 | >9.1 | 8.1 | 8.5 | 8.1 |
| Peeling strength (lb/in) | 8.4 | 8.4 | 8.6 | 8.5 | 8.5 | 8.4 | 8.4 | 8.3 | 8.5 | 8.6 |
| Glass transition temperature (Tg) (° C.) | 181 | 179 | 175 | 169 | 171 | 183 | 171 | 160 | 185 | 176 |
| Thermal decomposition test (° C.) | 378 | 375 | 382 | 387 | 378 | 373 | 380 | 387 | 362 | 370 |
| UL94 level | V-0 | V-0 | V-0 | V-0 | V-0 | V-0 | V-0 | V-0 | V-0 | V-0 |
| Toughness | good | good | good | good | good | good | good | good | bad | good |
| Stickiness of prepregs | no | no | no | no | no | no | no | Yes | no | no |
| Dielectric constant (Dk) (GHz) | 4.34 | 4.43 | 4.39 | 4.32 | 4.34 | 4.42 | 4.34 | 4.22 | 4.52 | 4.53 |
| Dissipation factor(Df) (GHz) | 0.008 | 0.008 | 0.008 | 0.006 | 0.008 | 0.009 | 0.008 | 0.005 | 0.012 | 0.014 |

As shown in Table 2, compared with the laminates prepared by using known resin compositions which use single SMA copolymer as the hardener (Comparative Examples 1 to 3), the laminates prepared by using the resin composition of the present invention (Examples 1 to 7) have lower hygroscopicity and solder floating endurance and do not have the disadvantages of using single SMA copolymer as a hardener, such as a low Tg, powder agglomeration, and the stickiness between the prepregs (Comparative Examples 1) when using the first SMA copolymer (EF-80) alone, or a poor toughness and a high Df (Comparative Examples 2) when using the second SMA copolymer (SMA-3000) alone. Furthermore, even the addition of TAIC can improve the toughness of the prepared laminate (Comparative Examples 3). However, such an addition also results in the increase of the Df value of the laminate and thus damages the electrical property of the laminate. The above damage is not found in the laminate prepared by using the resin composition of the present invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A resin composition comprising an epoxy resin and a hardener, wherein the amount of the hardener is about 10 parts by weight to about 200 parts by weight per 100 parts by weight of the epoxy resin and the hardener comprises a first styrene-maleic anhydride (SMA) copolymer and a second SMA copolymer, the first SMA copolymer has a molar ratio of styrene to maleic anhydride m1, the second SMA copolymer has a molar ratio of styrene to maleic anhydride m2, wherein m1≥8, m2<8 and m1−m2≥5.

2. The composition as claimed in claim 1, wherein the weight ratio between the first SMA copolymer and the second SMA copolymer is about 1:10 to about 10:1.

3. The composition as claimed in claim 2, wherein the weight ratio between the first SMA copolymer and the second SMA copolymer is about 1:5 to about 5:1.

4. The composition as claimed in claim 1, wherein m2<4.

5. The composition as claimed in claim 1, wherein the amount of the hardener is about 25 parts by weight to about 100 parts by weight per 100 parts by weight of the epoxy resin.

6. The composition as claimed in claim 1, which further comprises an allyl-containing compound.

7. The composition as claimed in claim 6, wherein the allyl-containing compound is triallyl isocyanurate (TAIL) and is in an amount of about 0.01 parts by weight to about 20 parts by weight per 100 parts by weight of epoxy resin.

8. The composition as claimed in claim 1, which further comprises a hardening promoter selected from the group consisting of 2-methyl-imidazole (2MI), 2-ethyl-4-methyl-imidazole (2E4MI), 2-phenyl-imidazole (2PI) and combinations thereof.

9. The composition as claimed in claim 1, which further comprises a filler selected from the group consisting of silica, glass powder, aluminum hydroxide, Talcum, Kaolin, pryan, mica and combinations thereof.

10. The composition as claimed in claim 1, which further comprises a solvent selected from the group consisting of cyclohexanone, toluene, xylene, acetone, butanone, methyl isobutyl ketone, N,N-dimethyl formamide (DMF), N,N-dimethyl acetamide (DMAc), N-methyl-pyrolidone (NMP) and combinations thereof.

11. A prepreg prepared by immersing a substrate into the composition as claimed in claim 1 and drying the immersed substrate.

12. A laminate prepared by superimposing a plurality of the prepreg as claimed in claim 11, superimposing a metal foil on at least one external surface of the superimposed prepregs to provide a superimposed object, and performing a hot-pressing operation onto the superimposed object.

* * * * *

UNITED STATES PATENT AND TRADEMARK OFFICE
CERTIFICATE OF CORRECTION

PATENT NO. : 8,734,950 B2  
APPLICATION NO. : 13/161311  
DATED : May 27, 2014  
INVENTOR(S) : Hsien-Te Chen et al.

Page 1 of 1

It is certified that error appears in the above-identified patent and that said Letters Patent is hereby corrected as shown below:

<u>In the Specification:</u>

In Column 1, Line 8, delete "No. 10012628" and replace with --No. 100112628--;

In Column 8, Line 29, delete "TRIC" and replace with --TAIC--;

<u>In the Claims:</u>

In Column 10, Line 45, delete "TAIL" and replace with --TAIC--.

Signed and Sealed this  
Fourteenth Day of July, 2015

Michelle K. Lee  
*Director of the United States Patent and Trademark Office*